United States Patent [19]

Ohta et al.

[11] Patent Number: 4,474,726
[45] Date of Patent: Oct. 2, 1984

[54] METHOD OF PRODUCING A CHANNELED PLASTIC PIPE WITH CLOSED CHANNEL ENDS

[75] Inventors: Ryozo Ohta; Takehiro Itoh; Hishayoshi Toyoshima; Jun Yoshikawa, all of Sakai, Japan

[73] Assignee: Kubota Tekko Kabushiki Kaisha, Osaka, Japan

[21] Appl. No.: 353,577

[22] Filed: Mar. 1, 1982

Related U.S. Application Data

[62] Division of Ser. No. 320,435, Nov. 12, 1981.

[30] Foreign Application Priority Data

Nov. 12, 1980 [JP] Japan .............................. 55-160044

[51] Int. Cl.³ .............................................. B29D 23/00
[52] U.S. Cl. ..................................... 264/516; 264/263; 264/322; 425/DIG. 218
[58] Field of Search ............... 264/322, 263, 512, 573, 264/516; 425/393, DIG. 218, DIG. 242; 156/196, 285, 294, 293

[56] References Cited

U.S. PATENT DOCUMENTS

| 4,065,243 | 12/1977 | Ada et al. ............................ 435/393 |
| 4,279,853 | 7/1981 | Ohta et al. .......................... 264/322 |
| 4,338,716 | 7/1982 | Marissen et al. ................... 264/322 |
| 4,344,461 | 8/1982 | Beune ................................. 138/109 |
| 4,390,383 | 6/1983 | van Dongeren .................. 156/196 |

FOREIGN PATENT DOCUMENTS

| 2536462 | 2/1977 | Fed. Rep. of Germany ...... 264/564 |
| 2444551 | 8/1980 | France ................................ 156/293 |
| 54-123180 | 9/1979 | Japan . |
| 56-55223 | 5/1981 | Japan ................................. 264/573 |
| 2030669 | 4/1980 | United Kingdom ............... 156/293 |

*Primary Examiner*—James B. Lowe
*Attorney, Agent, or Firm*—Oblon, Fisher, Spivak, McClelland & Maier

[57] ABSTRACT

A method of producing plastic pipe having air channels axially extending through the wall thereof, with at least one of the respective ends of the air channels being closed by an annular slotted channel-closure filled with a caulking material in its annular slot. The channel-closure is force-fitted on the pipe end, so that the caulking material is pressed into the air channels.

14 Claims, 18 Drawing Figures

FIG.12
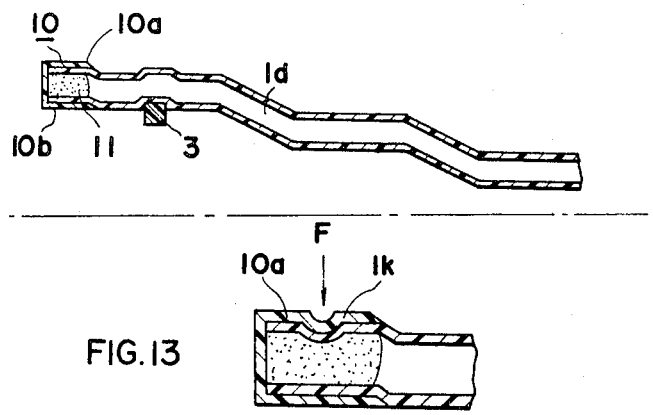
FIG.13
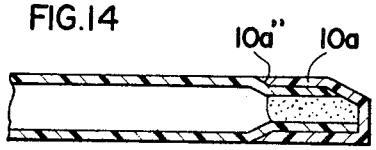
FIG.14
FIG.15
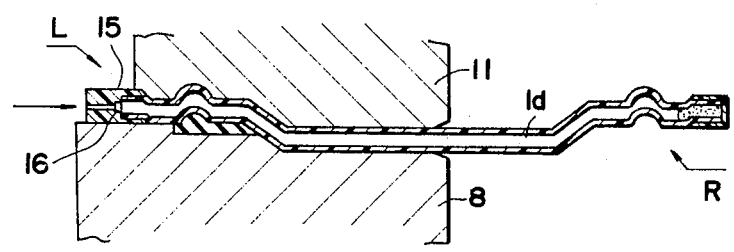
FIG.16
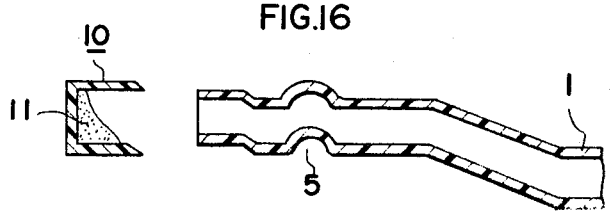
FIG.17
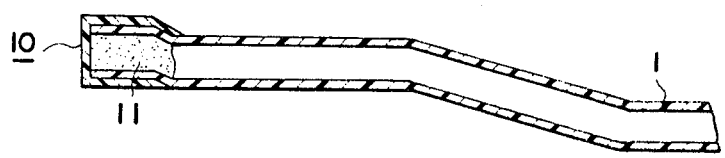

4,474,726

METHOD OF PRODUCING A CHANNELED PLASTIC PIPE WITH CLOSED CHANNEL ENDS

This is a division of application Ser. No. 320,435, filed Nov. 12, 1981.

BACKGROUND OF THE INVENTION

1. Field of the Invention

The present invention relates to a method of producing channeled plastic pipe having a number of air channels continuously axially extending through the wall thereof and more particularly, to such a pipe wherein at least one of the respective ends of said air channels are closed and the inner and outer surfaces of the closed region are finished as smooth surface.

2. Description of the Prior Art

There has heretofore been proposed a channeled pipe having a number of air channels continuously axially extending through the wall thereof as a way of saving raw material and increasing the flattening rigidity of the pipe. Particularly, channeled plastic pipes, such as are made of rigid polyvinyl chloride, can be compared with ordinary, non-channeled plastic pipes with regard to the surface conditions and basic physical properties, e.g., tensile strength. Thus, the technique for production of channeled plastic pipes has been established.

Because of their high flattening rigidity, such channeled plastic pipes are utilized as buried sewage pipes, in which case the manner of connecting them together is, e.g., as illustrated in FIG. 1. The left-hand end of each pipe 1 is a socket end 1a increased in diameter by being subjected to secondary processing and the right-hand end is a spigot end 1b not subjected to secondary processing. Thus, these pipes are of the so-called socket-spigot type. Therefore, a continuous line of pipe can be formed by inserting the spigot end 1b of each pipe 1 into the socket end 1a of the adjacent pipe 1 at its right end, and is buried in the ground 2. FIG. 2 is an enlarged section showing details of the socket-spigot joint. Air channels 1d extend continuously axially through the pipe wall. In addition, in the view taken along line III—III shown in FIGS. 3(A) and (B), the former refers to an oval (in cross-section) pipe 1A and the latter to a round (in cross-section) pipe 1B. In each case, a number of air channels 1d are formed in the pipe wall. Besides these cross-sectional shapes, there are many others, each presenting similar problems. Thus, if the pipeline is buried in the ground in the illustrated condition, rainwater, underground water or the like may flow in, as indicated by an arrow P, through the air channels 1d and out at the spigot end, as indicated by an arrow Q, into the pipeline or the water flowing through the pipeline may leak out through the air channels in the reverse direction. In such channeled plastic pipes, it becomes necessary to close the air channels 1d at the socket or spigot ends thereof. In addition, the socket end shown in FIGS. 1 and 2 has a first diameter-increased portion 1c and a second diameter-increased portion 1e, the latter having a plastic or metal retainer ring 3 set in the inner surface thereof for retaining a packing member 4 having an annular groove shaped complementary to the exposed portion of the retainer ring 3. The formation of such air channels is not limited to the pipe having the socket end shown in FIG. 2. Such air channels are often formed in various pipe constructions, including a simple extruded pipe with no secondary processing applied to either end thereof and a socket-spigot pipe with a single diameter-increased portion having a packing receiving annular groove 5 as shown in FIG. 4. Of course, there are also similar problems with these embodiments.

Therefore, it has been thought necessary to close such air channels at either the socket end or the spigot end thereof to prevent entry of outside water or leakage of inside water. For example, European Patent Publication Nos. 13,457 and 13,458 disclose a mechanism for applying a force which tends to squeeze or expand the pipe wall to thereby press the outer wall surface against the inner wall surface or the latter against the former, or force-fitting a blind plate to the pipe end surface. The portion thus processed, however, is formed with a constriction, which is a structural defect, on the outer or inner surface thereof, possibly leading to damage to the pipe unless special measures for reinforcement are taken. Further, since the pipe wall is only crimped under pressure, the resulting end-closing effect is insufficient, requiring the application of an auxiliary part in the form of a blind plate. However, such blind plate applied to the pipe end cannot be said to be sufficient since it could be easily removed by external forces unless it is held under adequate pressure.

Japanese Patent Laid Open Nos. 52222/1977, 127481/1979, 37344/1980, 73514/1980, 10681/1979, and 103480/1979 disclose means for crimping the end edge or end portion of pipe over a given length; however, the sealing quality of the crimped portion cannot always be said to be satisfactory, and water could pass therethrough. Further, Japanese Patent Laid Open No. 73512/1980 and Japanese Utility Model Laid Open Nos. 83024/1979 and 114812/1979 disclose means for fitting a plug into the end of each air channel, however, it is very difficult to ensure satisfactory positioning between the air channels and plugs. Another drawback is that the plugs tend to come off the air channels when subjected to a high outward force produced as the water pressure in the pipe builds up. Further, Japanese Patent Laid Open No. 123180/1979 discloses a method of closing air channels by injecting a foamable material into the air channels and then causing it to foam. However, it is very troublesome to inject such material individually into the air channels. Since it is difficult to uniformly control the amount of injection and the degree of foaming, the sealing quality differs in different air channels and some air channels are insufficiently closed while others are overfilled with such material, detracting from over all economy. There have been many other suggestions but none has been known which is satisfactory from the standpoint of easiness of operation, reliability and uniformity of closure, economy, external appearance, etc.

SUMMARY OF THE INVENTION

The present invention has been accomplished with the above in mind and has for its object the production of an air-channeled pipe with the air channels closed at their ends as uniformly and positively as possible. Another object of the invention is to provide a method whereby the ends of the air channels can be closed with great ease. A further object of the invention is to provide a processed pipe having its inner and outer surfaces finished as uniformly and smoothly as ordinary non-channeled pipes. Other objects of the invention will be fully understood from the following description.

These objects have been achieved by the present invention as described below.

A method of producing a plastic pipe with channel end closed according to the invention includes an annular slotted channel-closure (hereinafter referred to as U-cross-sectioned annular channel-closure) having two projecting walls adapted to clamp the inner and outer wall surfaces of the pipe end throughout the circumference thereof, at least one end of the pipe having the channel-closure fitted thereon, with a caulking material (the term "caulking material" as used herein includes those materials called "sealing material" or material which caulks and seals the channel ends filling a space extending from the slot bottom to the inlets of the channels. A corresponding method of forming such channel closing section with simplicity and reliability includes the steps of filling the U-slot of the U-cross-sectioned annular channel-closure with a caulking material, fitting the channel-closure on the end of the plastic pipe heated and softened, pressing them against each other while holding the fitting section between inner and outer mold parts, forcing a fluid into the channels of the plastic pipe to press the inner and outer surfaces of the fitting section against the inner and outer mold parts so as to smooth the inner and outer surfaces, removing the fitting section from the inner mold, and cooling the same.

Thus, the closing material in the present invention is a caulking material, which, unlike the conventional solid plug, is capable of plastic deformation, so that even if there is some error in the accuracy of the size and shape of the channels, the material will deform itself to accommodate such error. Thus, it has very high sealing quality and its adhesion to the plastic pipe is satisfactory. Unlike foaming materials, it does not require secondary processing, thereby avoiding increases in the number of production steps and in production time. Further, in the case of a foaming material, it tends to be injected deep into the channels, resulting in increased material cost. In contrast thereto, caulking materials used in the present invention are relatively inexpensive.

According to the invention, the caulking material is charged in advance into the U-slot of the U-cross-sectioned annular channel-closure and the latter is fitted on the pipe end, so that the caulking material can be uniformly charged circumferentially of the pipe. Therefore, there is there no variation in the sealing effect, nor is local overcharging. Thus, a uniform and reliable sealing effect can be obtained. In addition, the side to be closed is usually heated for secondary processing. Particularly where the plastic pipe end is increased in diameter to form a socket, a diameter-increasing force acts outwardly of the inner mold part 6 as indicated by arrows M in FIG. 5, so that hoop stresses $\tau_x$, $\tau_y$, $\tau_z$ are produced as indicated by arrows, respectively. Since the stresses $\tau_x$ and $\tau_z$ are produced in a region of relatively small cross-sectional area while the stress $\tau_y$ is produced in a region of relatively large cross-sectional area, $\tau_x$ and $\tau_z$ per unit area are larger than $\tau_y$ per unit area, with the result that pipe wall regions $1_x$ and $1_z$ acted upon $\tau_x$ and $\tau_z$, respectively, are circumferentially stretched, thereby forming small undulations 7, as shown in FIG. 6, in the pipe cross-section after heat-processing. The formation of such undulations is undesirable since they detract from the external appearance and, moreover, cause variations in the circumferential sealing effect when the pipe is connected to another pipe, particularly where a packing is interposed therebetween. Therefore, according to the invention, this relevant portion is held between the inner and outer mold parts and a fluid is then forced into the channels 1d to expand the latter, thereby successfully avoiding formation of undulations. Further, since the caulking material is pressed against the U-slot by the pressurized fluid, as described above, it is spread onto the inner surfaces of the channels 1d to fill the channels, so that there is no danger of a clearance being formed between the inner surfaces of the channels 1d and the caulking material.

While the invention has been generally described so far, concrete examples of the arrangement of the invention and its merits will become apparent from the following detailed description of the invention.

BRIEF DESCRIPTION OF THE DRAWINGS

Various other objects, features and attendant advantages of the present invention will be more fully appreciated as the same becomes better understood from the followng detailed description when considered in connection with the accompanying drawings in which like reference characters designate like or corresponding parts throughout the several views and wherein:

FIGS. 7 through 12 are sectional views showing a step by step production procedure;

FIG. 13 is a sectional view of a channel closing section;

FIG. 14 is a sectional view of a channel closing section at the spigot end;

FIGS. 15 and 16 are sectional views illustrating a process for closing the channels at both ends in a double-spigot joint; and FIG. 17 is a sectional view showing an application of the invention to an adhesive agent type joint.

DETAILED DESCRIPTION OF THE PREFERRED EMBODIMENTS

Figure 7:
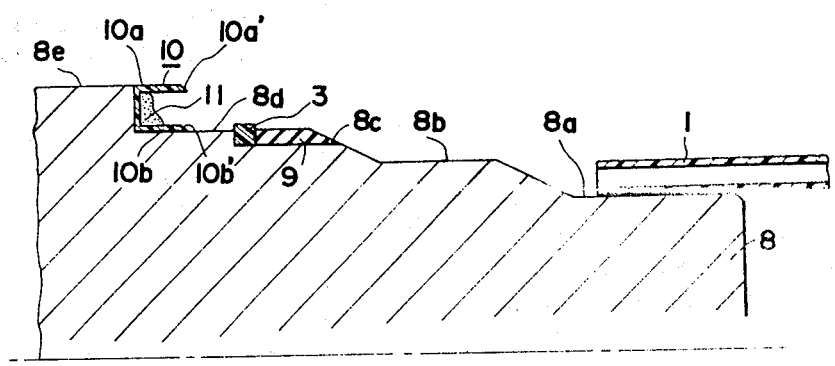

In FIG. 7, an inner mold part 8 is formed with 5 steps 8a, 8b, 8c, 8d and 8e, step 8c having a rubber form or split form 9 and a packing engaging ring 3 fitted thereon so that the packing engaging ring 3 abuts against the back surface of such step, and step 8e having a U-cross-sectioned annular channel-closure 10 fitted thereon so that it abuts against the back surface of such step, with a caulking material charged into the U-slot. The annular channel-closure 10 has outer and inner peripheral projecting walls 10a and 10b having their front ends tapered portion-chamfered, as shown. The taper 10a' of the outer peripheral projecting wall 10a is formed to face away from the U-slot and the tapered portion 10b' of the inner peripheral projecting wall 10b is formed to face toward the U-slot. The material of the annular channel-closure is not limited in particular. Preferably, it is the same plastic as that of the pipe, but rigid rubber or stainless steel may be used as needed.

The caulking material is a soft material which is used for caulking and sealing purposes. Since it must be soft and capable of deforming to enter the channels through the open ends thereof, it is desired that it be plastic and flowable to a great degree and yet it must set as quickly as possible after entry. Materials which meet all these requirements include two-liquid type thermosetting resins, e.g., epoxy resins, and thermosetting resins, whether one-liquid or two-liquid type, such as silicone resins and butyral resins. Sometimes, thermoplastic resins (acrylic resin) and butyl rubber may be used. Typical of them are epoxy resins. To illustrate concrete examples of composition, it is preferable to use epoxy resins having a polyamide type setting agent incorporated therein in amounts greater than the theoretical amount or epoxy resins having incorporated therein a plasticizer or non-reactive diluent, such as DBP, coal tar, polyethylene glycol, and polypropylene glycol.

Such caulking material is charged into the U-slot of the annular channel-closure and the latter is fitted on the innermost region of the step $8d$ of the inner mold part 8 which is heated.

Figure 1:
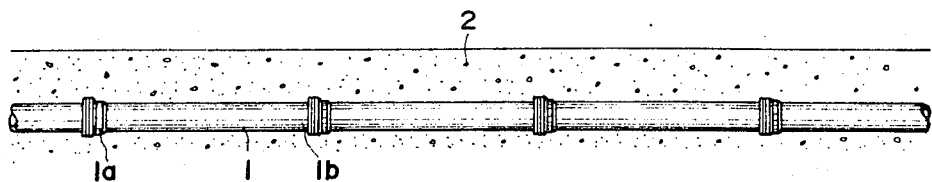
FIG. 1 is a sectional view showing a conventional pipeline buried in the ground.
Figure 2:
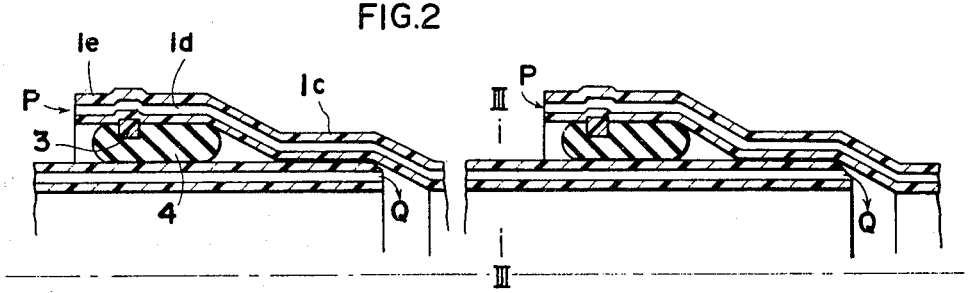
FIG. 2 is an enlarged sectional view of a pipe joint section.
Figure 3A:
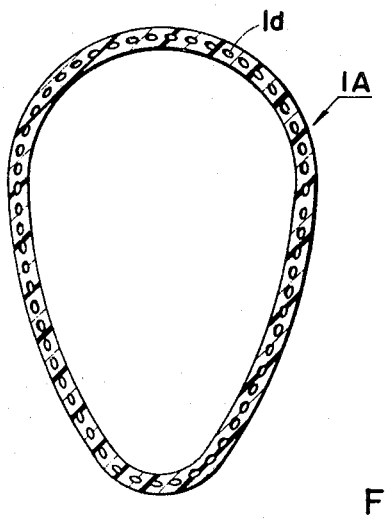
FIG. 3 is a section taken along the line III—III of FIG. 2.
Figure 3B:
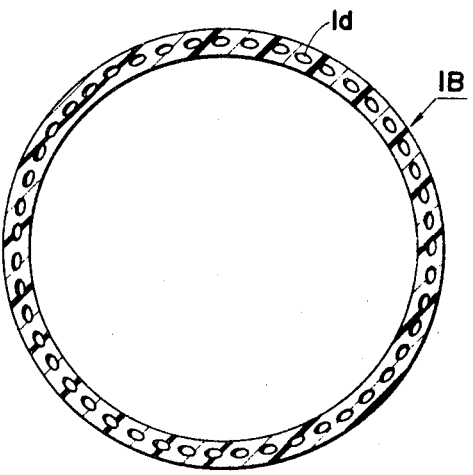
Figure 4:
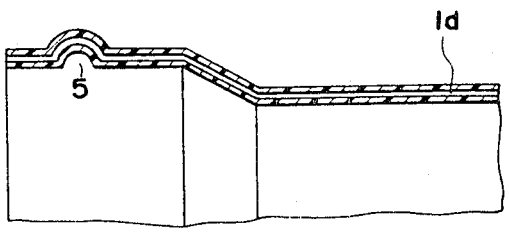
FIG. 4 is an enlarged sectional view showing another pipe.
Figure 5:
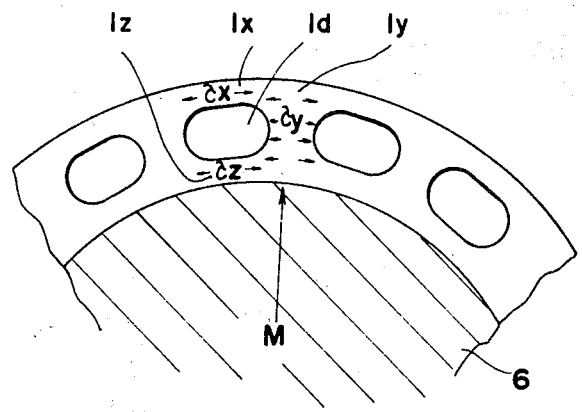
FIG. 5 is a schematic view illustrating pressure developing conditions during hot diameter-increasing process in accordance with the present invention
Figure 6:
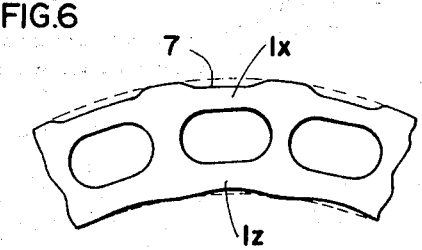
FIG. 6 is an end view showing small undulations formed on the peripheral surfaces of the pipe.
Figure 8:
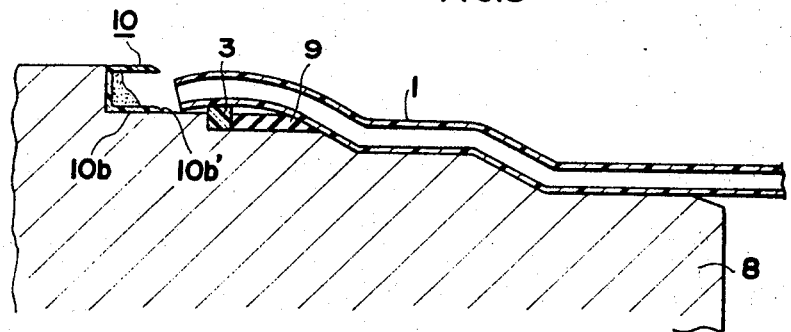
Figure 9:
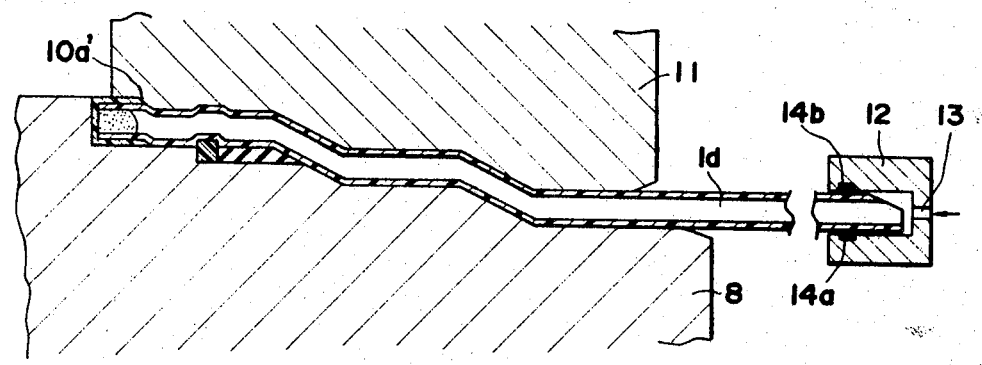

The channeled pipe 1 is slid along the guide portion (the step $8a$) of the inner mold part after it has been heated to its plasticizing temperature. Therefore, it is successively increased in diameter by the tapering portions and the step $8c$ and moved over the rubber form 9 and the packing engaging ring 3 toward the annular channel-closure 10, as shown in FIG. 8. Since the inner peripheral projecting wall $10b$ of the channel-closure 10 is formed with the tapered surface $10b'$, as described above, the front end of the channeled pipe 1 is smoothly inserted into the U-slot of the channel-closure 10. Since the caulking material in the channel-closure cannot escape, it is pressed between the slot bottom surface of the channel-closure and the non-channeled surface region of the pipe to be uniformly squeezed into the channels $1d$, as shown in FIG. 9. Subsequently, the outer mold part 110, divided into three or four pieces, is radially inwardly clamped to establish the state illustrated in FIG. 9. In the illustrated example the outer mold part 110 has been clamped later, but it may be clamped in advance and the channeled pipe 1 may then be pushed into an annular clearance defined between the outer mold part 11 and the inner mold part 8. When the FIG. 9 state is established, a blowing jig 12 adapted to cover the spigot end surface, as shown at right in FIG. 9, is fitted in position and a fluid is blown in from a mozzle 13 in the direction of arrow, whereby the fluid is forced into the channels $1d$. This eliminates small undulations described in FIGS. 5 and 6. Further, the charging density of the caulking material in the channels is increased. In addition, $14a$ and $14b$ in FIG. 9 denote packings. Since the taper surface $10a'$ of the outer peripheral projecting wall of the channel-closure 10 supports the radially inward pressure from the outer mold part 110 on its entire area, as shown in FIG. 9, an even and beautiful appearance is presented.

Figure 10:
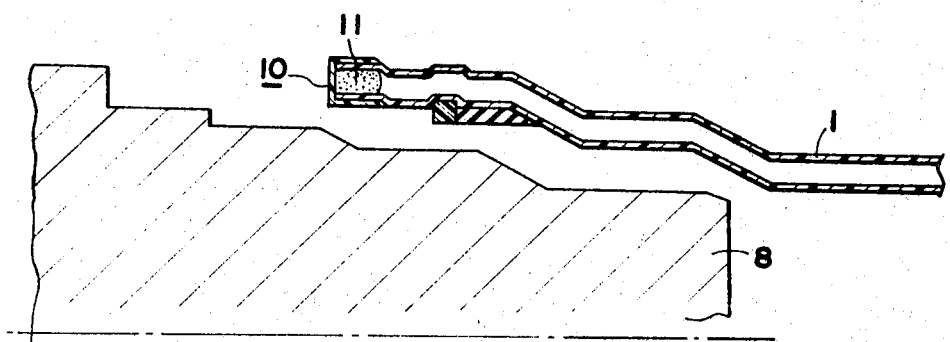
Figure 11:
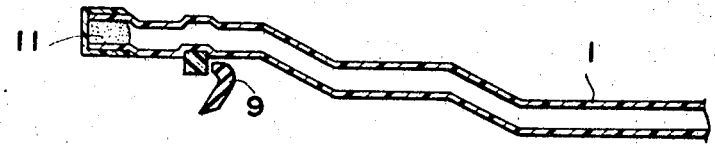

With the first stage of the molding operation thus completed, cooling is applied as by introducing a coolant between the outer and inner mold parts 110 and 8 or releasing the outer mold part 110 from the clamping force and feeding cool air or cold water. The molded pipe and the inner mold part 8 are then separated from each other, as shown in FIG. 10, and the molded pipe is further cooled. In the case of the rubber form 9, it is pulled out by being deformed as shown in FIG. 11 and in the case of the split form, it is pulled out by being disassembled.

FIG. 12 is a sectional view showing the finished socket portion, with the packing engaging ring 3 being set in the inner surface of the socket portion, the annular channel-closure 10 being fitted on the front end surface, and the channels $1d$ being filled with the caulking material 11. In this manner, the channels $1d$ are closed and the socket having a beautiful appearance is formed. In the inner surface of the socket, the inner peripheral projecting wall $10b$ is flush with the inner surface of the pipe, while in the outer surface of the socket the taper surface $10a'$ of the outer peripheral projecting wall $10a$ is smoothly continuous with the outer surface of the pipe. Thus, even if the channel-closure 10 is caught by something, it is prevented from coming off since the projecting walls $10a$ and $10b$ provide nothing which functions as a hook. After the caulking material 11 has fully set, the adhesion between the caulking material 11 and the channels $1d$ provides strong binding therebetween. Before it fully sets, however, there is a danger of the channel-closure coming off. If necessary, therefore, a force F may be applied in the direction of arrow as shown in FIG. 13 to recess the outer peripheral wall surface $1k$ of the pipe 1 at suitable places or throughout the circumference thereof so as to prevent the channel-closure from coming off and such is also included in the scope of the invention.

FIG. 14 shows an example in which the invention is applied to the spigot end. Since the outer surface of the spigot is rubbed against a seal packing when being inserted into the socket, it would be inconvenient to have the outer peripheral projecting wall $10a$ extending beyond the outer surface of the pipe as in the case of FIG. 12. Therefore, the outer peripheral projecting wall $10a$ in FIG. 14 is formed with a tapered surface $10a''$ facing toward the U-slot. As a result, both the inner and outer surfaces are even.

FIGS. 15 and 16 are sectional views showing a procedure for closing the channels at both ends of a double-spigot pipe. The right-hand side (R) is closed in the same procedure as described above, and then the left-hand side (L) is closed. FIG. 15 is a sectional view corresponding to FIG. 9, but unlike the latter the side R has already been closed. Therefore, in preventing formation of small undulation on the side L, it is impossible to blow in a pressurized fluid from the side R. Therefore, in FIG. 15, a fluid blowing jig 15 whose fitting portion has the same shape as the channel-closure is fitted on the front end of the side L and a pressurized fluid is blown in from a nozzle 16. Since the channels $1d$ are completely sealed, the undulations on the side L are pressed between the inner mold part 8 and the outer mold part 110, so that a beautiful appearance is presented as in the case of FIG. 9. After the socket has been cooled to the extent that it will not deform, the mold is released from the clamping force, a channel-closure 10 filled with a caulking material 11 similar to that used in the preceding examples is fitted on the processed socket end, and it is heated, as needed, to accelerate setting, thereby completing the double-end closing operation. In addition, as shown in FIG. 17, the invention is also applicable to the closing of channels in a simple diameter-increased socket of the adhesive bond type.

With the invention arranged in the manner described above each of, the channels in a channeled pipe can be uniformly and reliably closed at one or both ends thereof by a simple method and at the same time formation of small undulations, which otherwise would easily form, on the inner and outer surfaces of the pipe can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A method for closing the ends of the channels at one end of a plastic pipe having a plurality of channels extending axially in the pipe wall and opening on the axial faces of the pipe, said method comprising the steps of:
   (a) charging a caulking material into an annular slotted channel-closure, said channel-closure having a base and inner and outer projecting walls which are sized and shaped to hold the inner and outer surfaces of the pipe wall at one end of the pipe therebetween around the entire periphery of the pipe, said caulking material being charged into the annular slot defined by said base and said inner and outer projecting walls;
   (b) pressing said annular slotted channel-closure over said one end of the pipe so as to force said caulking material into said plurality of channels; and
   (c) forcing a fluid into said plurality of channels at the other end of the pipe so as to bear against said caulking material in said plurality of channels and to compact it between said fluid and said base of said slotted channel-closure.

2. A method as recited in claim 1 and further comprising the steps of:
   (a) heating said one end of said plastic pipe to soften it before pressing said annular slotted channel-closure over said one end; and
   (b) sliding said one end of the softened plastic pipe over an inner mold which increases said one end in size before said one end is pressed into said annular slotted channel-closure.

3. A method as recited in claim 2, wherein said inner mold has a plurality of portions of increasing size in the direction in which said one end is slid over said inner mold, whereby said one end is increased in size in a plurality of portions of increasing size during the sliding-while-softened step.

4. A method as recited in claim 2 and further comprising the steps of positioning a packing engaging ring on said inner mold and sliding said one end over said packing engaging ring while said one end is in its softened condition but before said one end is pressed into said annular slotted-channel closure, whereby said packing engaging ring becomes adhered to the inner surface of the pipe wall.

5. A method as recited in claim 4 and further comprising the step of clamping said one end with an outer mold so as to press the inner surface of the pipe wall firmly against said packing engaging ring while said one end is in its softened condition.

6. A method as recited in claim 2 and further comprising the step of clamping said one end with an outer mold so as to press the inner surface of the pipe wall firmly against said inner mold while said one end is in its softened condition and while the fluid in said plurality of channels brings the inner and outer surfaces of the pipe wall into intimate contact with said inner and outer mold parts so as to smooth the inner and outer surfaces of the pipe wall.

7. A method as recited in claim 2 and further comprising the step of cooling said inner mold after said one end has been increased in size in order to facilitate removal of said one end from said inner mold.

8. A method as recited in claim 2 wherein said one end is formed into a socket joint.

9. A method as recited in claim 2 wherein said inner projecting wall of said annular slotted channel-closure has an inclined surface around its periphery which slopes away from said base and towards the central axis of the pipe, said inclined surface serving as a chamfer guiding said one end into said annular slotted channel-closure.

10. A method as recited in claim 6 wherein said inner projecting wall of said annular slotted channel-closure has an inclined surface around its periphery which slopes away from said base and towards the central axis of the pipe, said inclined surface serving as a chamfer guiding said one end into said annular slotted channel-closure.

11. A method as recited in claim 10 wherein:
   (a) said outer projecting wall of said annular slotted channel-closure has an inclined surface around its periphery which slopes away from said base and towards the central axis of the pipe and
   (b) said outer mold is shaped to form said one end immediately outside said annular slotted channel-closure into a smooth continuation of said inclined surface.

12. A method as recited in claim 2 and further comprising the step of pressing said outer projecting wall of said annular slotted channel-closure at right angles to the central axis of the pipe while said one end is in its softened condition to cause said annular slotted channel-closure to adhere firmly to said one end.

13. A method as recited in claim 1 wherein said plurality of channels are closed at both ends of the pipe.

14. A method as recited in claim 13 wherein the two ends of the pipe are formed into the mating parts of a socket joint.

* * * * *